(No Model.)
T. J. GILLETTE.
SPIRIT LEVEL.
No. 457,992. Patented Aug. 18, 1891.
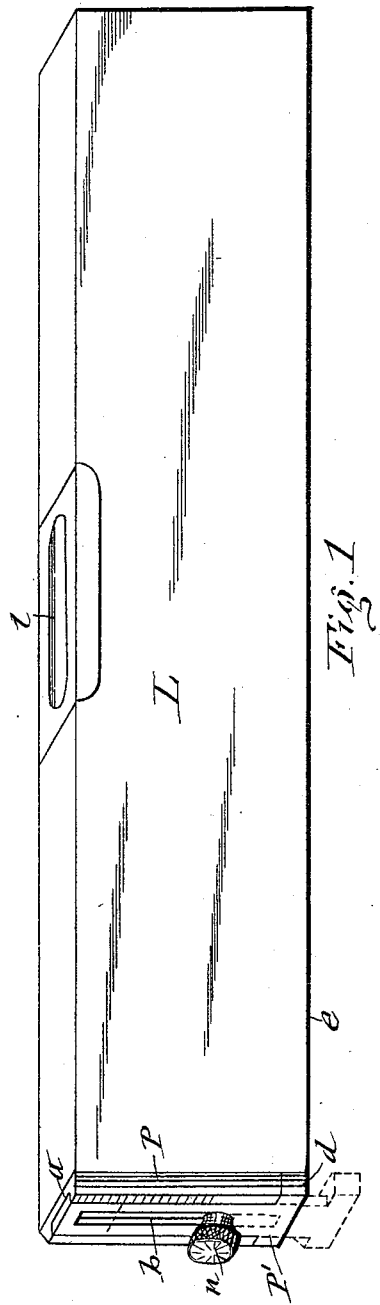
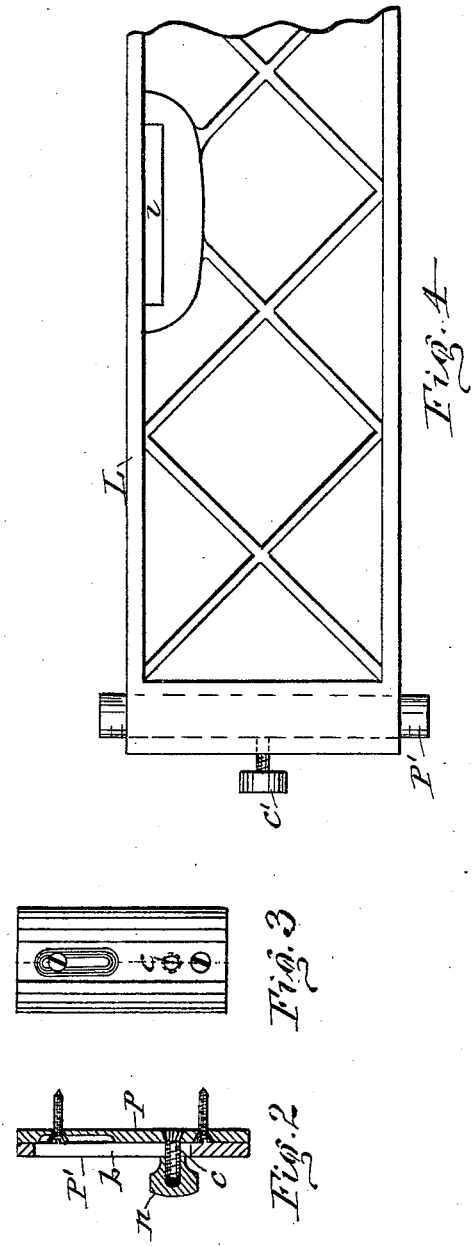
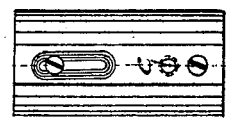
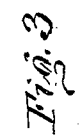
Witnesses
A. F. Walz
C. L. Bendixon
Inventor:
Thurber J. Gillette
By his Attorneys
Duell, Laass & Duell

UNITED STATES PATENT OFFICE.

THURBER J. GILLETTE, OF SYRACUSE, NEW YORK.

SPIRIT-LEVEL.

SPECIFICATION forming part of Letters Patent No. 457,992, dated August 18, 1891.

Application filed October 4, 1890. Serial No. 367,040. (No model.)

*To all whom it may concern:*

Be it known that I, THURBER J. GILLETTE, of Syracuse, in the county of Onondaga, in the State of New York, have invented new and useful Improvements in Inclination-Gages for Spirit-Levels, of which the following, taken in connection with the accompanying drawings, is a full, clear, and exact description.

This invention relates to the class of spirit-levels which are chiefly used by carpenters and other mechanics for setting structures into horizontal positions, and which are provided with a gage for determining the inclination of structures.

The object of this invention is to provide the level with a gage which shall be simple and convenient in construction and operation and by means of which not only the aforesaid inclination can be determined, but also structures such as gutters, &c., can be set to the requisite inclination; and to that end it consists in the combination, with the level, of a plate secured to the end of the body of the lever and provided with a vertical groove, a plate sliding in said groove and provided with a vertical slot, a screw-threaded stud-pin secured to the first-named plate and projecting through the slot of the second plate, and a nut on the protruding end of said stud-pin, as hereinafter more fully described, and specifically set forth in the claim.

In the annexed drawings, Figure 1 is a perspective view of a spirit-level embodying my invention. Fig. 2 is a vertical transverse section through the center of the gage and its supporting-plate. Fig. 3 is an end view of the level with the movable gage removed, and Fig. 4 is a side view of a level formed of metal and showing a modification of the gage specially designed for such levels.

Similar letters of reference indicate corresponding parts.

L represents the body of the level provided with the usual spirit-bubble $l$.

P' represents the gage, which is connected to said body movably at right angles to the straight edge thereof and outward from said edge.

The body L is composed either of wood or metal. When of wood, I rigidly attach to the end thereof a metal plate P, which is formed with a vertical groove $a$. In this groove is fitted to slide vertically another plate P', which constitutes the adjustable gage. This plate or gage is formed with an enlarged base $d$, by which it abuts against the bottom of the plate P when in its normal position, and the plate P' is also provided with a vertical slot $b$, through which protrudes a screw-threaded stud-pin $c$, rigidly attached to the plate P, and to the protruding end of said stud-pin is connected the nut $n$, which, when tightened, bears on the plate P' and clamps the same in its position. The plate P is secured to the body L in such a position as to cause the bottom edge of the plate or gage P' to be flush with the face of the straight edge $e$ of the level when said gage is pushed up so as to abut with its base $d$ against the plate P.

On the face of the plate P, adjacent to the plate or gage P', I prefer to mark a graduated scale by which to determine the degree of the projection of the gage P' from the straight edge of the level. By setting said gage so as to project the desired distance from the level and then placing the level with its said gage upon the object designed to be placed in an inclined position and adjusting said object until the level is brought into a horizontal position the aforesaid object is adjusted to the desired inclined position. In this manner gutters, eaves-troughs, and other conduits can be accurately adjusted in their positions.

When the gage is to be applied to a level whose body is composed of metal, I preferably drill vertically through the end portion of the body L a channel, into which I insert the gage P', which in this case is of cylindrical form. A screw-threaded eye is to be formed in the end of the body L at right angles to the gage P', and in said eye is inserted the set-screw $c'$, as shown in Fig. 4 of the drawings.

Having described my invention, what I claim as new, and desire to secure by Letters Patent, is—

The combination, with the level L, of the plate P, secured to the end of the body of the level and provided with the vertical groove $a$, the plate P', sliding in said groove and provided with the vertical slot $b$, the screw-threaded stud-pin $c$, secured to the plate P and projecting through the slot $b$, and the nut $n$ on the protruding end of said stud-pin, substantially as described and shown.

In testimony whereof I have hereunto signed my name this 30th day of September, 1890.

THURBER J. GILLETTE. [L. S.]

Witnesses:
C. L. BENDIXON,
C. H. DUELL.